(12) United States Patent
Kudo et al.

(10) Patent No.: US 6,441,063 B1
(45) Date of Patent: Aug. 27, 2002

(54) THERMOPLASTIC RESIN COMPOSITION, PROCESS FOR PRODUCTION THEREOF, AND BIAXIALLY ORIENTED FILM PRODUCED FROM SAID COMPOSITION

(75) Inventors: Takafumi Kudo; Masahiko Kosuge; Akira Kameoka, all of Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/720,878

(22) PCT Filed: Jan. 29, 1999

(86) PCT No.: PCT/JP99/03486

§ 371 (c)(1),
(2), (4) Date: Jan. 2, 2001

(87) PCT Pub. No.: WO00/00552

PCT Pub. Date: Jan. 6, 2000

(30) Foreign Application Priority Data

Jun. 30, 1998 (JP) ............................. 10-184022
Jul. 1, 1998 (JP) ............................. 10-186289
Jul. 1, 1998 (JP) ............................. 10-186290

(51) Int. Cl.$^7$ .............................. C08J 9/04; C08J 9/06; C08J 9/32; C08K 3/34; B32B 3/26
(52) U.S. Cl. .................. 523/218; 523/206; 523/209; 523/212; 524/493; 428/304.4; 428/312.6; 428/315.5
(58) Field of Search ................... 523/218, 206, 523/209, 212; 524/493; 428/304.4, 312.6, 315.5

(56) References Cited

U.S. PATENT DOCUMENTS 5,318,833 A * 6/1994 Fujimoto et al.
5,878,854 A * 3/1999 Tomita et al.
6,057,041 A * 5/2000 Sumi et al.

FOREIGN PATENT DOCUMENTS

| JP | 63-304038 | 12/1988 | |
|----|-----------|---------|--|
| JP | A-1-157806 | 6/1989 | ............. B29B/7/84 |
| JP | 4-298538 | 10/1992 | |
| JP | 4-309551 | 11/1992 | |
| JP | 4-336227 | 11/1992 | |
| JP | A-6-91635 | 4/1994 | ............. B29B/7/48 |
| JP | 7-502301 | 3/1995 | |
| JP | 7-228733 | 8/1995 | |
| JP | 7-286095 | 10/1995 | |
| WO | 95/25770 | 9/1995 | |

* cited by examiner

Primary Examiner—Tae H. Yoon
(74) Attorney, Agent, or Firm—Sughrue Mion, PLLC

(57) ABSTRACT

A thermoplastic resin composition containing inorganic particles, wherein (i) the inorganic particles have pore volume of 0.1 to 3 ml/g and (ii) the inorganic particles are treated at the surfaces with a hydrophilic polyester of 0.05 to 10 times the weight of the inorganic particles or with a silicon-containing organic compound. This composition can be obtained by feeding a dispersion of the above-mentioned surface-treated inorganic particles into a vented double-screw kneader and extruder to mix it with a thermoplastic resin.

24 Claims, No Drawings

THERMOPLASTIC RESIN COMPOSITION, PROCESS FOR PRODUCTION THEREOF, AND BIAXIALLY ORIENTED FILM PRODUCED FROM SAID COMPOSITION

DETAILED DESCRIPTION OF THE INVENTION

1. Field of the Invention

The present invention relates to a thermoplastic resin composition, a process for production thereof, and a film produced from said composition. More particularly, the present invention relates to a thermoplastic resin composition obtained by kneading a thermoplastic resin and particular inorganic particles using a vented double-screw kneader and extruder, a process for production thereof, and a biaxially oriented film produced from said composition.

2. Prior Art

Thermoplastic resins, particularly aromatic polyesters have excellent physical and chemical properties and are therefore used in a large amount in the fields of fiber, film, resin, etc. Meanwhile, they are known to arouse, in producing a molded product therefrom or in handling the molded product, a problem of reduction in workability, productivity or product value, caused by inferior slipperiness.

For such a problem, it was proposed to add fine particles to a thermoplastic resin to produce a molded product having appropriate surface unevenness and improved slipperiness. As the fine particles, there are being used inorganic particles of, for example, silica, titanium dioxide, calcium carbonate, talc or kaolinite. In adding inorganic particles, however, the presence of large particles therein poses a problem. The presence of large particles causes, in the case of, for example, a film for magnetic tape, reduction in electromagnetic transduction property or drop out and impairs important film qualities. To remove such large particles, it is generally conducted, in adding inorganic particles during polymer synthesis, to convert the inorganic particles into a slurry or solution, subject the slurry or solution to grinding and sifting, and then add the resulting material. This operation, however, requires a large cost and a long time for slurry formation, grinding and sifting; moreover, when the particles after the above operation are added during polymer synthesis, the particles cause reagglomeration and it is impossible to completely prevent the incoming of large particles. In recent years, it has been conducted to produce various kinds of value-added polymers from a single master polymer. In this case, addition of particles during polymer synthesis incurs a big operational loss when the kind of particles used is changed.

Hence, there were proposed, for example, a method which comprises kneading powdery particles into a polyester using a single-screw extruder or a double-screw kneader and extruder (JP-A-1-157806), or a method which comprises adding, to a polyester, a liquid slurry of particles dispersed in a medium (JP-A-6-91635). When these methods are applied to inorganic particles, however, insufficient disintegration of agglomerated particles or large particles takes place if the shear stress applied is insufficient, resulting in inferior dispersion of particles in resin; if the shear stress is too high, excessive disintegration of particles takes place, resulting in decreased particle sizes, and the intended slipperiness, etc. are not achieved.

When the inorganic particles are, in particular, silica particles, the silica particles agglomerate easily because they have a large number of silanol groups on the surfaces. When the above-mentioned methods are applied to silica particles, insufficient disintegration of agglomerated particles or large particles takes place if the shear stress applied is insufficient, resulting in inferior dispersion of particles in resin; if the shear stress is too high, excessive disintegration of particles takes place, resulting in decreased particle sizes, the intended slipperiness, etc. are not achieved, and excessive disintegration further incurs reagglomeration and formation of large particles.

To prevent the agglomeration of silica particles, it is generally conducted to treat a silica powder with a silicon-containing organic compound. The silica powder treated with a silicon-containing organic compound is already in commercial production and is in use in various applications.

When the above-mentioned methods are applied to the silica powder treated with a silicon-containing organic compound, the silica powder is easily dispersed in non-polar solvents for its hydrophobicity but is very difficult to disperse in polar solvents.

Problems to Be Solved by the Invention

The present inventors made a study in order to alleviate the above-mentioned drawbacks of the conventional method for addition of particles and produce a thermoplastic resin film superior particularly in slipperiness and surface uniformity. As a result, the present invention has been completed.

An object of the present invention is to provide a thermoplastic resin composition wherein inorganic particles are easily synthesized in a thermoplastic resin, whereby particles in the obtained thermoplastic resin have good dispersibility, and a process for production of such a composition.

Other object of the present invention is to provide a biaxially oriented film produced, by the above process, from a thermoplastic resin composition wherein inorganic particles are contained in good dispersibility.

Means for Solving the Problems

According to the study made by the present inventors, the above object of the present invention is achieved by a thermoplastic resin composition containing inorganic particles, wherein (i) the inorganic particles have pore volume of 0.1 to 3 ml/g and (ii) the inorganic particles are treated at the surfaces with a hydrophilic polyester of 0.05 to 10 times the weight of the inorganic particles or with a silicon-containing organic compound.

The above thermoplastic resin composition of the present invention is classified into the following compositions (a) and (b), based on the kind of the compound used for surface treatment of inorganic particles.

(a) A thermoplastic resin composition containing inorganic particles, wherein (i) the inorganic particles have pore volume of 0.1 to 3 ml/g and (ii) the inorganic particles are treated at the surfaces with a hydrophilic polyester of 0.05 to 10 times the weight of the inorganic particles.

(b) A thermoplastic resin composition containing silica particles, wherein (i) the silica particles have pore volume of 0.1 to 3 ml/g and (ii) the inorganic particles are treated at the surfaces with a silicon-containing organic compound.

The study by the present inventors further found out that the above thermoplastic resin composition can be produced by a process for producing a thermoplastic resin composition by kneading a thermoplastic resin and inorganic particles using a vented double-screw kneader and extruder, in which process (i) the inorganic particles have pore volume of 0.1 to 3 ml/g, (ii) the inorganic particles are treated at the surfaces with a hydrophilic polyester of 0.05 to 10 times the weight of the inorganic particles or with a silicon-containing organic compound, and the inorganic particles are fed into the vented double-screw kneader and extruder in the form of their dispersion in water and/or an inert organic solvent.

The present invention is described below in more detail.

As the thermoplastic resin constituting the composition of the present invention, there are mentioned a polyethylene, a polypropylene, polyamides, polyesters, and the like. Of these, an aromatic polyester is preferred.

As the aromatic polyester, an aromatic polyester composed of an aromatic dicarboxylic acid as a main acid component and an aliphatic glycol as a main glycol component is particularly preferred. The aromatic dicarboxylic acid can be exemplified by terephthalic acid, 2,6-naphthalenedicarboxylic acid and 4,4'-diphenyldicarboxylic acid. Of these, terephthalic acid or 2,6-naphthalenedicarboxylic acid is preferred. The aliphatic glycol can be exemplified by ethylene glycol, propylene glycol, 1,4-butanediol and 1,4-cyclohexanedimethanol. Of these, ethylene glycol is preferred.

The polyester is preferably a homopolymer composed of the above aromatic dicarboxylic acid component and the above aliphatic glycol component, but the polyester may be a copolymer containing a third component in a small amount. The third component can be exemplified, when the main component is ethylene terephthalate, by diols such as diethylene glycol, propylene glycol, neopentyl glycol, polyalkylene glycol, 1,4-cyclohexanedimethanol and the like; dicarboxylic acids such as succinic acid, adipic acid, sebacic acid, phthalic acid, isophthalic acid, 2,6-naphthalenedicarboxylic acid and the like; and polyfunctional polycarboxylic acids such as trimellitic acid, pyromellitic acid and the like. When the main component is ethylene 2,6-naphthalate, there can be mentioned the same third components as mentioned above, except that 2,6-naphthalenedicarboxylic acid is converted to terephthalic acid.

As to the thermoplastic resin used in the present invention, there is no particular restriction as long as it can be efficiently produced by a known method or a method whose techniques have been accumulated in the industry. The thermoplastic resin may contain, as necessary, a metal-based catalyst, for example, a compound of lithium, sodium, calcium, magnesium, manganese, zinc, antimony, germanium, titanium or the like, and additives such as phosphorus compound (as stabilizer) and the like.

The inorganic particles also constituting the present thermoplastic resin composition have pore volume of 0.1 to 3 ml/g, preferably 0.3 to 2.5 ml/g. When inorganic particles having pore volume larger than 3 ml/g are used, the resulting thermoplastic resin composition gives a film of insufficient slipperiness and low handleability. When inorganic particles having pore volume smaller than 0.1 ml/g are used, the cost for producing such particles is high, leading to the high cost of molded product. Therefore, such inorganic particles are not desired.

As to the inorganic particles used in the present invention, there is no particular restriction. As preferred specific examples of the inorganic particles, there can be mentioned silica, titanium dioxide, calcium carbonate, talc and kaolinite. Of these, silica is suitable. The average particle diameter of these inorganic particles is 0.03 to 5 $\mu$m, preferably 0.05 to 3 $\mu$m. When the average particle diameter is smaller than 0.03 $\mu$m, the travelling property and abrasion resistance of the film obtained are insufficient. When the average particle diameter is larger than 5 $\mu$m, the film obtained has too large a surface roughness or low transparency. Therefore, such average particle diameters are not preferred.

The inorganic particles used in the present invention have no particular restriction as to the production process, the shape or the like. The present invention is effective even to inorganic particles which have a number of silanol groups on the surfaces and thereby cause dehydration and condensation during kneading with a thermoplastic resin to form large particles, such as amorphous silica produced by wet process.

In the present invention, the amount of the inorganic particles added to the thermoplastic resin is preferably 0.01 to 10% by weight, more preferably 0.01 to 5% by weight to the thermoplastic resin. When the amount is larger than 10% by weight, no sufficient dispersibility is obtained. When the shear stress applied is increased for higher dispersion, disintegration of particles and reduction in particle size take place; consequently, when, for example, a film is produced, the film has an increased friction coefficient and low handleability. When the amount is smaller than 0.01% by weight, the effect of particles addition is not sufficient.

As mentioned previously, the inorganic particles contained in the thermoplastic resin of the present invention, preferably have an average particle diameter of 0.03 to 5 $\mu$m. Further preferably, the inorganic particles have at least two peaks in the particle size distribution. When the peaks in the particle size distribution are two, the difference in particle diameter between the two peaks is preferably 0.3 $\mu$m or more, more preferably 0.5 $\mu$m or more. When the peaks in the particle size distribution are three or more, the difference in particle diameter between the maximum peak having the largest height and the minimum peak having the smallest height is preferably the same as mentioned for the above case of two peaks.

In the present invention, the peak(s) in the particle size distribution of the inorganic particle can be determined from a frequency distribution wherein the particle frequency to the particle diameter of inorganic particles is expressed as the area of particles, obtained by, for example, a laser diffraction method and/or an observation method using an electron microscope (the both methods are described later). In the present invention, "a plurality of peaks" refer to such a case that there are, in the frequency distribution, at least two peaks (one of these peaks is the maximum height peak), there is, between the maximum peak and other peak(s), at least one valley whose height is 70% or less of the height of the maximum peak, and the height(s) of the other peak(s) is (are) 10% or more of the height of the maximum peak.

In the present invention, the inorganic particles are used after having been treated, at the surfaces, with a hydrophilic polyester or with a silicon-containing organic compound.

First, description is made on the surface treatment of the inorganic particles with a hydrophilic polyester.

In the present invention, the amount of the hydrophilic polyester used for the surface treatment of the inorganic particles is necessarily 0.05 to 10 times in weight (5 to 1,000% by weight) to the inorganic particles, preferably 0.3 to 8 times in weight (30 to 800% by weight), particularly preferably 0.5 to 6 times in weight (50 to 600% by weight). When the amount of the hydrophilic polyester is less than 0.05 time in weight to the inorganic particles, the inorganic particles cause agglomeration and, therefore, when a thermoplastic resin containing such inorganic particles is molded into, for example, a film, large particles are formed in the film. When the amount is larger than 10 times in weight, the dispersion of such inorganic particles has a very high viscosity, making very difficult the quantitative feeding of the dispersion into a vented double-screw kneader and extruder, and the film obtained has a high haze and low transparency.

The operation of the surface treatment of the inorganic particles with the hydrophilic polyester can be conducted at any desired step as long as the step is before the kneading of the inorganic particles with the thermoplastic resin, that is, before the feeding of the inorganic particles into a vented double-screw kneader and extruder.

The hydrophilic polyester used for the surface treatment of the inorganic particles can be any water-soluble or water-dispersible polyester. That is, the hydrophilic polyester is a polyester which can be dissolved and/or finely dispersed in a liquid medium described later. The acid component constituting the hydrophilic polyester can be exemplified by polycarboxylic acids such as terephthalic acid, isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodiumsulfoisophthalic acid, 2-pottasiumsulfoterephthalic acid, trimellitic acid, trimesic acid, trimellitic anhydride, phthalic anhydride, p-hydroxybenzoic acid, monopotassium salt of trimellitic acid and the like. The hydroxy compound component can be exemplified by polyhydroxy compounds such as ethylene glycol, propylene glycol, 1,3-propanediol, 1,4-butanediol, 1,6-hexanediol, neopentyl glycol, 1,4-cyclohexanedimethanol, p-xylene glycol, ethylene oxide adduct of bisphenol A, propylene oxide adduct of bisphenol A, diethylene glycol, triethylene glycol, polyethylene oxide glycol, polytetramethylene oxide glycol, dimethylolpropionic acid, glycerine, trimethylolpropane, sodium dimethylolethylsulfonate, potassium dimethylolpropionate and the like. A hydrophilic polyester can be produced from these compounds by a per se known process. That is, a polycarboxylic acid and a polyhydroxy compound are subjected to ester interchange, followed by polycondensation at a high temperature under reduced pressure; or, an ester-forming derivative of a polycarboxylic acid and a polyhydroxy compound are subjected to ester interchange, followed by polycondensation at a high temperature under reduced pressure; thereby, a hydrophilic polyester can be produced. In order to produce a hydrophilic polyester favorably, it is preferred to allow the polyester to contain therein a sulfonic acid salt group-containing compound. The sulfonic acid salt group-containing compound includes metal salts of sulfoisophthalic acid, sulfoterephthalic acid, sulfonaphthalene-2,6-dicarboxylic acid, ester-forming derivative thereof, etc. As the preferable metal of the metal salts, there can be mentioned sodium, lithium, potassium, magnesium, etc. Use of 5-sodiumsulfoisophthalic acid is preferred particularly. The content of the sulfonic acid salt group-containing compound in the acid component is in a range of preferably 0.1 to 30 mole %, more preferably 0.1 to 15 mole %. When the content is lower than 0.1 mole %, the water solubility or dispersibility of the hydrophilic polyester is insufficient. When the content is higher than 30 mole %, the thermal stability when a thermoplastic resin was formed, is inferior. Such a hydrophilic polyester may be a self-crosslinking type having functional group in the molecule, or may be crosslinked using a curing agent such as melamine resin, epoxy resin or the like.

In the present invention, there is no particular restriction as to the method for surface treatment of the inorganic particles with the hydrophilic polyester. However, preferred is, for example, a method which comprises dissolving and/or finely dispersing a hydrophilic polyester in a medium and then mixing thereinto inorganic particles to form a slurry.

As to the medium for the hydrophilic polyester, there is no particular restriction, and a known medium can be used. However, water and/or a mixed liquid consisting of water and an organic solvent is preferred from the standpoint of safety. As the organic solvent in the mixed liquid, an organic solvent capable of dissolving the hydrophilic polyester is preferred. The content of the organic solvent is preferably 3% by weight or less, more preferably 1% by weight or less to the total of the liquid medium and the hydrophilic polyester. There is no particular restriction as to the method for preparing a solution composed mainly of a hydrophilic polyester, and a generally known method can be used. For example, a hydrophilic polyester is dissolved in hot water with stirring; or, a hydrophilic polyester is dissolved in a hydrophilic organic solvent which has a water solubility of 20 g or more per liter of water, at 20° C. and has a boiling point of 100° C. or less or shows azeotropy with water at 100° C. or less. The organic solvent can be exemplified by dioxane, acetone, tetrahydrofuran and methyl ethyl ketone. To the thus-obtained hydrophilic polyester solution can be added a small amount of a surfactant in order to promote the dissolution and/or fine dispersion of the hydrophilic polyester. To the solution is added water with stirring, priferably with high-speed stirring under heating, to obtain an aqueous solution. This aqueous solution can also be obtained by adding the hydrophilic polyester solution to water being stirred. The aqueous solution is subjected to separation and removal of the organic solvent. For example, hydrophilic organic solvent removal is conducted at ordinary pressure or under reduced pressure, whereby an intended aqueous polyester solution is obtained.

As the above-mentioned surfactant, a known surfactant can be used. There can be mentioned, for example, a polyoxyethylene alkylphenyl ether, a polyoxyethylene-fatty acid ester, a sorbitan-fatty acid ester, a glycerine-fatty acid ester, a metal soap of a fatty acid, an alkylsulfuric acid salt, an alkylsulfonic acid salt, an alkylsulfosuccinic acid salt, quaternary ammonium chloride, an alkylamine hydrochloride and sodium dodecylbenzenesulfonate.

There is no particular restriction as to the method for converting the inorganic particles into a slurry. It is possible to conduct grinding or disintegration and then sieving, or conduct sieving and then grinding or disintegration. Or, it is possible to subject inorganic particles to grinding or disintegration and/or sieving by a dry method and then convert the resulting inorganic particles into a slurry using the above-mentioned aqueous polyester solution. Or, a dry method and a wet method may be combined appropriately. For example, inorganic particles may be ground by a dry method and then converted into a slurry, and the slurry may be subjected to sieving by a wet method; or, inorganic particles may be disintegrated and/or sieved by a dry method and the resulting inorganic particles may be subjected to grinding by a wet method.

In order to obtain a uniform slurry, a dispersant, an anti-foaming agent, etc. may be added as long as the effect of the present invention is not impaired. Specific examples of these additives are sodium polystyrenesulfonate, sodium polyacrylate, carboxymethyl cellulose, a polyvinyl alcohol, a salt of a copolymer of a vinyl compound and a carboxylic acid type monomer, a partial alkyl ester of a polyacrylic acid, a polyalkylenepolyamine, ammonia, ammonia salts, sodium hydroxide, sodium salts such as sodium hexametaphosphate and sodium pyrophosphate, onium compounds such as tetraethylammonium chloride, tetramethylammonium hydroxide and tetramethylphosphonium bromide, and an antifoaming silicone.

Amount of the slurry in the aqueous polyester solution, that is, the total amount of the hydrophilic polyester and the inorganic particles in the solution is preferably 5 to 50% by weight, more preferably 10 to 40% by weight. A total amount of less than 5% by weight is not preferred because the amount of the slurry added to the thermoplastic resin at the time of production is large inevitably. A total amount of more than 50% by weight makes high the slurry viscosity at the time of converting into the slurry, resulting in reduced workability.

The medium used for preparing a dispersion of the inorganic particles surface-treated with a hydrophilic polyester must be, for example, water and/or an organic compound whose boiling point is lower than the melting point of the thermoplastic resin to which the dispersion is to be added. Water, methanol, ethanol, ethylene glycol, etc. are preferred in view of the economy and handleability. Water is the most preferred medium in view of the safety.

Next, description is made on methods in the present invention for the surface treatment of the inorganic particles with a silicon-containing organic compound. The particles to be treated with a silicon-containing organic compound may be the above-mentioned inorganic particles, but are preferred to be, in particular, silica particles. Therefore, the description on the surface treatment of the inorganic particles with a silicon-containing organic compound is made on a case of the surface treatment of silica particles.

In the surface treatment of silica particles with a silicon-containing organic compound, the number of silanol groups on the surfaces of the silica powder after treatment is preferred to be as small as possible. The number A of silanol groups is preferably 2 $\mu$mol/m$^2$ or less, particularly preferably 1.5 $\mu$mol/m$^2$ or less. When the number A is more than 2 $\mu$mol/m$^2$, the surface treatment of silica particles is insufficient, the silica particles cause agglomeration, and their dispersibility in film is low.

Here, the number A of silanol groups=(silanol group number ($\mu$mol/g) on silica particle surface)/(specific area (g/m$^2$) of particle)

The number A of silanol groups on silica particle surface can be determined by titration using trimethylamine. A bulky tertiary amine such as trimethylamine or the like hardly reacts with the silanol groups in the pores of silica particles, owing to the bulkiness, takes part in the interaction between silica particles, and enables measurement of only the silanol groups on the particle surfaces.

The silicon-containing organic compound usable in the treatment of silica particles can be any silicon-containing organic compound which has, at the terminal, functional group capable of bonding with the silanol groups on the silica particle surfaces and further has hydrophobic group. As such a compound, an alkylsilane compound is preferred. As the alkylsilane compound preferably used for the surface treatment of silica particles, there can be mentioned, for example, a halogenosilane, an alkyldisilazane and an alkoxysilane. Specific examples are as follows. The halogenosilane can be exemplified by monomethylchlorosilane, dimethyldichlorosilane and trimethylchlorosilane. The alkyldisilazane can be exemplified by hexamethyldisilazane. The alkoxysilane can be exemplified by trimethylmethoxysilane and dimethyldimethoxysilane. Trimethylmethoxysilane is particularly preferred for the easy handling.

A dispersant can be used for the surface-treated silica particles. The dispersant can be any dispersant as long as it has a polar moiety and a non-polar moiety in the molecule and does not give any adverse effect in the subsequent steps for production of thermoplastic resin composition or in the molded product produced from the composition. The compound having a polar moiety and a non-polar moiety in the molecule can be exemplified by so-called surfactants. There can be used ordinary dispersants and surfactants such as sodium alkylbenzenesulfonate, sodium succinate, sodium alkylphosphate, sodium polycarboxylate, polyoxyethylene alkyl ether and the like. Particularly preferred are sulfonic acid salt compounds and/or carboxylic acid salt compounds such as sodium alkylbenzenesulfonate, sodium succinate and the like.

The amount of the dispersant is preferably 0.01 to 100% by weight, particularly preferably 0.1 to 50% by weight to the silica particles. When the amount of the dispersant is less than 0.01% by weight, it is impossible to disperse the silica particles sufficiently in the polar medium. Meanwhile, an amount exceeding 100% by weight of the dispersant is excessive and is not preferred from an economical standpoint.

The medium used for preparing a dispersion of the surface-treated silica particles is water and/or an inert organic medium whose boiling point is lower than the melting point of the thermoplastic resin to which the dispersion is to be added. Water, methanol, ethanol, ethylene glycol, etc. are preferred in view of the economy and handleability. Water is the most preferred medium for the safety.

Next, description is made on process for producing a thermoplastic resin composition in the present invention. The above-mentioned inorganic particles surface-treated with a hydrophilic polyester or the above-mentioned silica particles surface-treated with a silicon-containing organic compound have very high dispersibility in a thermoplastic resin to which the particles are to be added. Therefore, by using these particles in the form of a dispersion in water and/or an inert organic medium, a thermoplastic resin composition can be obtained using a vented double-screw kneader and extruder.

In the present invention, there is no particular restriction as to the method for feeding an inorganic particles-containing dispersion into a vented double-screw kneader and extruder, as long as the method is efficient, safe and quantitative and does not adversely affect the dispersibility of the inorganic particles. However, in order to remove the water and/or the organic compound whose boiling point is lower than the melting point of the thermoplastic resin, it is necessary that at least one vent hole of the kneader and extruder is kept under reduced pressure. The vacuum of the vent hole is kept preferably at 13,300 Pa or less, more preferably at 6,700 Pa or less, further preferably at 4,000 Pa or less.

In the present invention, regarding the kneading conditions of the vented double-screw kneader and extruder, it is preferred to control the shear stress in a given range. This can be achieved by controlling the melt viscosity of the thermoplastic resin in the shear rate employed during kneading, in a given range. The melt viscosity of the thermoplastic resin is controlled preferably at 10 to 1,000 Pa.S, more preferably at 50 to 500 Pa.S. When the melt viscosity is less than 10 Pa.S, the dispersibility of the inorganic particles added is insufficient. Meanwhile, when the melt viscosity is higher than 1,000 Pa.S, the inorganic particles added are disintegrated and come to have smaller sizes.

According to the process in the present invention, inorganic particles can be contained in a thermoplastic resin uniformly at a high concentration. Therefore, it is possible to produce a thermoplastic resin composition containing inorganic particles in a dispersed state at a high concentration, dilute the composition with a thermoplastic resin containing substantially no particles, and use the diluted composition as a thermoplastic resin composition. In the thermoplastic resin composition obtained by the present process, the inorganic particles cause no agglomeration and are dispersed uniformly. Therefore, when the composition is made into a stretched film, the film has a surface of uniform unevenness free from large projections and is superior in slipperiness and abrasion resistance. The thermoplastic resin composition of the present invention may contain two or more kinds of inorganic particles. The thermoplastic resin composition obtained by the present invention can be made into a single-layered or multi-layered film by a per se known method.

In the present invention, the film produced from the thermoplastic resin composition containing inorganic particles is required to have a friction coefficient of 1.0 or less. When the friction coefficient exceeds 1.0, the film is insufficient in slipperiness when it is wound in a roll form after produced, and the roll has wrinkles, thereby making the winding difficult, with results of reducing productivity significantly and, in an extreme case, losing the commercial value of the film. The film produced from the thermoplastic resin composition is further required to have a film haze satisfying the following formula. When the film haze does not satisfy the following formula, the film is inferior in transparency and is unsuitable for applications such as wrapping and the like.

$$H<0.2T+1.5$$

wherein H is a film haze (%) and T is a film thickness ($\mu$). This film can be produced by a known method.

For example, a single-layered polyester film can be obtained by subjecting a polyester to melt extrusion form a die, rapidly cooling the extrudate on a cooling drum to obtain an unstretched film, stretching the unstretched film in the longitudinal direction with heating (for example, at a temperature ranging from Tg minus 10° C. to Tg plus 70° C. (Tg is the glass transition temperature of the polyester)) to obtain a monoaxially stretched film, then stretching the monoaxially stretched film in the transverse direction with heating (for example, at a temperature ranging from Tg to Tg plus 70° C.) to obtain a biaxially stretched film, and applying thereto thermal setting and/or thermal relaxation. The resulting biaxially oriented film preferably has a thickness of 0.5 to 150 $\mu$m, particularly preferably 1 to 100 $\mu$m. The draw ratio of the film differs depending upon the application, but both the longitudinally stretching ratio and the transversely stretching ratio are preferred to be 2 to 6. The thermal setting and/or the thermal relaxation can be conducted by a known means under known conditions, depending upon the application of the film.

A double-layered polyester film can be produced in the same manner as above mentioned method and conditions employed for the single-layered polyester film except that two kinds of polyesters are subjected to co-extrusion to obtain an unstretched double-layered film.

Effects of the Invention

According to the present invention, inorganic particles can be added to a thermoplastic resin easily; therefore, there can be provided a thermoplastic resin composition wherein inorganic particles are dispersed in a thermoplastic resin at a high dispersibility, a process for production thereof, and a biaxially oriented film produced from the composition.

EXAMPLES

The present invention is described in more detail below by way of Examples. However, the present invention is in no way restricted by the following Examples as long as the gist of the present invention remains unchanged. In the Examples, various phisical properties, the methods for measurement of particular properties and the definitions are as follows.
(1) Pore Volumes of Particles
  Measured by the method described in JIS 1150-5.2.
(2) Average Particle Diameter of Particles
  The average particle diameter of particles is measured by the following methods.
1) When Measured for a Dispersion
  Particles are dispersed in a medium to obtain a dispersion; to the dispersion is added ethylene glycol or water to obtain a low-concentration liquid; the liquid is subjected to measurement of average particle diameter using a laser analyzer (SALD-2000 produced by Shimadzu Corporation).
2) When Measured for Particles in Film
  A small film sample is fixed onto a sample support for scanning type electron microscope, and the surface of the sample is subjected to ion etching using a sputtering apparatus (IB-2 Ion Coater produced by Eiko Engineering K. K.) under the following conditions.
  That is, the sample is placed in the cylinder jar of the sputtering apparatus; the vacuum of the jar is lowered to 7 Pa; and ion etching is conducted at a voltage of 0.90 KV at a current of 5 mA for about 5 minutes.
  Further, the surface of the resulting film sample is subjected to gold sputtering using the same apparatus; and the resulting film sample is observed using a scanning type electron microscope at a magnification of 500 to 30,000, to determine an average particle diameter corresponding to area of round thereof.
(3) Property of Slurry
  Water is added to an inorganic powder treated with a hydrophilic polyester or with a silicon-containing organic compound, to obtain a slurry. The slurry is visually observed for the property and also examined for the quantitative feedability into double-screw kneader and extruder.
  ○: The slurry is a uniform mixture of a powder and water, and its quantitative feeding into double-screw kneader and extruder is easy.
  X: The slurry has a high viscosity and its quantitative feeding into double-screw kneader and extruder is difficult.
(4) Dispersibility
  The number (per 100 cm$^2$) of large particles (agglomerated particles) having diameters of 10 $\mu$m or more is measured for a biaxially oriented film using an optical microscope, and the dispersibility of inorganic particles in the film is evaluated based on the following rating standard. The concentration of inorganic particles in the film is set at 0.06% by weight to the polyester contained in the film.
  Rating standard
  ○: Less than 100
  Δ: 100 to less than 1,000
  X: 1,000 or more
(5) Haze of Film
  Measured using POIC Haze Meter SET HS-D1 produced by Nihon Seimitsu Kogyosha.

(6) Static Friction Coefficient of Film

The static friction coefficient of film is measured using a slip tester according to ASTM D 1894-63.

Example 1

To amorphous silica particles having an average particle diameter of 1.7 μm, obtained by wet synthesis was dropwise added, with stirring, a polyester (Z-465, a product of Goo Kagaku K.K.) (a contents of hydrophilic polyester is 15 wt %) in an amount of 300% by weight to the particles. Then, water was added to prepare an aqueous dispersion containing 5% of silica particles. The aqueous dispersion was a uniform good slurry. Then, undried polyethylene terephthalate chips containing 0.4% by weight of water were fed into a vented co-rotating intermeshing double-screw kneader and extruder having kneading disc paddles as a screw element, at a rate of 20 kg/hr from a vibrating metering feeder; simultaneously therewith, the above-obtained aqueous dispersion was added using a Milton type metering pump so that the particles concentration in the composition obtained became 0.4% by weight. At that time, the vacuum of the vent hole was set at 133 Pa, and melt kneading was conducted at a cylinder temperature of 285° C., followed by extrusion, to obtain a silica particles-containing polyester composition. This composition was mixed with a polyester containing no particles so that the particles concentration in the mixed polyester became 0.06% by weight. The mixed polyester was subjected to melt extrusion at 290° C., and the extrudate was wound round a casting drum having a surface temperature of 35° C., by electrostatic casting, for cooling and solidification to obtain a unstretched film having a thickness of about 240 μm. This unstretched film was stretched 3.1 times in the longitudinal direction at 95° C. and 3.1 times in the transverse direction at 100° C. Then, the stretched film was thermoset at 205° C. to produce a biaxially stretched polyester film having a thickness of 25 μm. The results are shown in Table 1. The dispersibility of the silica particles in the polyester film obtained was good, and a film of high transparency, low friction coefficient and good handleability could be obtained.

Examples 2 to 3 and Comparative Examples 1 to 3

An operation was conducted in the same manner as in Example 1 except that the amount of the polyester used for treatment of the silica particles was changed as shown in Table 1. The results are shown in Table 1.

Comparative Example 4

An operation was conducted in the same manner as in Example 1 except that the pore volume of the amorphous silica particles obtained by wet synthesis was changed as shown in Table 1. The results are shown in Table 1.

Example 4

An operation was conducted in the same manner as in Example 1 except that the average particle diameter and pore volume of the amorphous silica particles obtained by wet synthesis were changed as shown in Table 1. The results are shown in Table 1.

Example 5

An operation was conducted in the same manner as in Example 1 except that the inorganic particles used were changed to kaolin. The results are shown in Table 1.

Example 6

An operation was conducted in the same manner as in Example 1 except that the thickness of the unstretched film was changed to about 21 μm and the thickness of the biaxially oriented polyester film was changed to 2 μm. The results are shown in Table 1.

Example 7

An operation was conducted in the same manner as in Example 1 except that the polyethylene terephthalate chips fed into the vented co-rotating intermeshing double-screw kneader and extruder was changed to polyethylene 2,6-naphthalate chips, the cylinder temperature of the extruder and the melt extrusion temperature during film making were changed to 305° C., the thickness of the unstretched film was changed to about 21 μm, the stretching temperature of the unstretched film was changed to 130° C., the thermosetting temperature was changed to 225° C., and the thickness of the biaxially oriented polyester film was changed to 2 μm. The results are shown in Table 1.

Example 8

To spherical colloidal silica particles having an average particle diameter of 0.12 μm was dropwise added, with stirring, a polyester (Z-465, a product of Goo Kagaku K.K.) (a 15 weight % hydrophilic polyester) in an amount of 100% by weight to the particles. Then, water was added to prepare an aqueous dispersion containing 10% of silica particles. The aqueous dispersion was a uniform good slurry. Then, undried polyethylene terephthalate chips containing 0.4% by weight of water were fed into a vented co-rotating intermeshing double-screw kneader and extruder having kneading disc paddles as a screw element, at a rate of 20 kg/hr from a vibrating metering feeder; simultaneously therewith, the above-obtained aqueous dispersion was added using a Milton type metering pump so that the particles concentration in the composition obtained became 1.0% by weight. The thus-obtained spherical colloidal silica-containing master polymer was mixed with the master polymer containing wet synthesis amorphous silica, obtained in Example 1 and a polyester containing no particles, to obtain a polyester containing 0.03% by weight of wet synthesis amorphous silica and 0.03% by weight of spherical colloidal silica as particles concentration therein. The subsequent operation was conducted in the same manner as in Example 1. The results are shown in Table 1.

Example 9

To an alumina powder (crystal form: θ type) having an average particle diameter of 0.21 μm was dropwise added, with stirring, a polyester (Z-465, a product of Goo Kagaku K.K.) (a 15 weight % hydrophilic polyester) in an amount of 100% by weight to the particles. Then, water was added to prepare an aqueous dispersion containing 10% of silica particles. The aqueous dispersion was a uniform good slurry. Then, undried polyethylene terephthalate chips containing 0.4% by weight of water were fed into a vented co-rotating intermeshing double-screw kneader and extruder having kneading disc paddles as a screw element, at a rate of 20 kg/hr from a vibrating metering feeder; simultaneously therewith, the above-obtained aqueous dispersion was added using a Milton type metering pump so that the particles concentration in the composition obtained became 0.4% by weight. The thus-obtained alumina-containing master polymer was mixed with the master polymer containing wet synthesis amorphous silica, obtained in Example 1 and a polyester containing no particles, to obtain a polyester containing 0.03% by weight of wet synthesis amorphous silica and 0.03% by weight of alumina as particles concentration therein. The subsequent operation was conducted in the same manner as in Example 1. The results are shown in Table 1.

film was stretched 3.1 times in the longitudinal direction at 95° C. and 3.1 times in the transverse direction at 100° C. Then, the stretched film was thermoset at 200° C. to produce

TABLE 1

| | inorganic particles (1) | | | | | inorganic particles (2) | | | | property of film | | |
|---|---|---|---|---|---|---|---|---|---|---|---|---|
| | | average | | addition amount | | | average | | addition amount | | | |
| | kind | particle diameter (μm) | pore volume (ml/g) | of hydrophilic polyester (% to powder) | property of slurry | kind | particle diameter (μm) | pore volume (ml/g) | of hydrophilic polyester (% to powder) | dispersiblity | film haze (%) | static friction coefficient |
| Ex. 1 | silica | 1.7 | 1.5 | 300 | ◯ | — | — | — | — | ◯ | 3.3 | 0.45 |
| C. Ex. 1 | silica | 1.7 | 1.5 | no addition | ◯ | — | — | — | — | X | 3.0 | 0.48 |
| Ex. 2 | silica | 1.7 | 1.5 | 8 | ◯ | — | — | — | — | ◯ | 3.2 | 0.47 |
| Ex. 3 | silica | 1.7 | 1.5 | 980 | ◯ | — | — | — | — | ◯ | 6.2 | 0.46 |
| C. Ex. 2 | silica | 1.7 | 1.5 | 3 | ◯ | — | — | — | — | X | 3.1 | 0.48 |
| C. Ex. 3 | silica | 1.7 | 1.5 | 1,010 | X | — | — | — | — | ◯ | 7.0 | 0.43 |
| C. Ex. 4 | silica | 1.7 | 3.5 | 300 | ◯ | — | — | — | — | ◯ | 3.4 | 1.07 |
| Ex. 4 | silica | 0.5 | 0.9 | 300 | ◯ | — | — | — | — | ◯ | 2.5 | 0.70 |
| Ex. 5 | kaolin | 1.5 | 0.5 | 300 | ◯ | — | — | — | — | ◯ | 3.5 | 0.40 |
| Ex. 6 | silica | 1.7 | 1.5 | 300 | ◯ | — | — | — | — | ◯ | 1.7 | 0 72 |
| Ex. 7 | silica | 1.7 | 1.5 | 300 | ◯ | — | — | — | — | ◯ | 1.8 | 0.70 |
| Ex. 8 | silica | 1.7 | 1.5 | 300 | ◯ | spherical silica | 0.12 | 0.3 | 100 | ◯ | 2.8 | 0.51 |
| Ex. 9 | silica | 1.7 | 1.5 | 300 | ◯ | θ type alumina | 0.21 | 1.2 | 100 | ◯ | 2.7 | 0.52 |

Ex.: Example
C. Ex.: Comparative Example

Example 10

In water were dispersed wet synthesis amorphous silica particles having an average particle diameter of 1.5 μm, a pore volume of 1.5 ml/g and a specific surface area of 300 m²/g. Thereto was dropwise added, with stirring, trimethylmethoxysilane of 4% by weight to the particles. The resulting mixture was heated to 65° C., then stirred for 1 hour at that temperature, and allowed to cool. The reaction mixture was subjected to vacuum distillation, and the residue was subjected to vacuum drying for 2 hours to obtain a treated silica powder. The powder was measured for number of silanol groups, which was 110 μmol/g, and the number A of the silanol groups on the powder surface was 0.36 μmol/m². To the powder were added 1% by weight (to the silica particles) of sodium succinate and 100% by weight (to the silica particles) of methanol. To the resulting mixture was added water with stirring, to prepare a water-methanol mixed dispersion containing 10% by weight of silica particles. The dispersion was a uniform good slurry. Then, undried polyethylene terephthalate chips containing 0.4% by weight of water were fed into a vented co-rotating intermeshing double-screw kneader and extruder having kneading disc paddles as a screw element, at a rate of 20 kg/hr from a vibrating metering feeder; simultaneously therewith, the above-obtained aqueous dispersion was added using a Milton type metering pump so that the particles concentration in the composition obtained became 0.4% by weight. At that time, the vacuum of the vent hole was set at 133 Pa, and melt kneading was conducted at a cylinder temperature of 285° C., followed by extrusion. The thus-obtained silica particles-containing polyester composition was mixed with a polyester containing no particles so that the particles concentration in the mixed polyester became 0.06% by weight. The mixed polyester was subjected to melt extrusion at 290° C., and the extrudate was wound round a casting drum having a surface temperature of 35° C., by electrostatic casting, for cooling and solidification to obtain a unstretched film having a thickness of about 130 μm. This unstretched film was stretched 3.1 times in the longitudinal direction at 95° C. and 3.1 times in the transverse direction at 100° C. Then, the stretched film was thermoset at 200° C. to produce a biaxially stretched polyester film having a thickness of 14 μm. The results are shown in Table 2. The dispersibility of the silica powder in the polyester film obtained was good, and a film of high transparency, low friction coefficient and good handleability could be obtained.

Examples 11 and 12

An operation was conducted in the same manner as in Example 10 except that the pore volume of the silica particles was changed as shown in Table 2. The dispersibility of the silica powder in the polyester film obtained was good, and a film of low friction coefficient and good handleability could be obtained.

Comparative Example 5

An operation was conducted in the same manner as in Example 10 except that the treatment with a silicon-containing organic compound was not conducted. The results are shown in Table 2. The dispersion was a good slurry, but the dispersibility of silica powder in film was inferior.

Comparative Example 6

An operation was conducted in the same manner as in Example 10 except that the pore volume of the silica powder was changed as shown in Table 2. As in Examples 10 to 12, the dispersibility of the silica powder in the polyester film obtained was good and the film obtained had a low friction coefficient and good handleability. However, the production cost of the silica powder was high, inviting an increased cost of molded product; therefore, the film was not desirable in the industrial production, particularly in the cost.

Comparative Example 7

An operation was conducted in the same manner as in Example 10 except that the pore volume of the silica powder was changed as shown in Table 2. The results are shown in Table 2. The dispersibility of the silica powder in the polyester film obtained was good, but the film obtained had a high friction coefficient and inferior handleability.

Example 13

An operation was conducted in the same manner as in Example 10 except that the silicon-containing organic compound used for hydrophobic treatment of the silica powder was changed to n-decylmethoxysilane. The results are shown in Table 2. The dispersibility of the silica powder in the polyester film obtained was good, and a film of low friction coefficient and good handleability could be obtained.

Comparative Example 8

An operation was conducted in the same manner as in Example 10 except that the average particle diameter and pore volume of the silica powder were changed as shown in Table 2. The results are shown in Table 2. The dispersibility of the silica powder in the polyester film obtained was good, but the film obtained had a very high friction coefficient which was unmeasurable.

Comparative Example 9

An operation was conducted in the same manner as in Example 10 except that the average particle diameter and pore volume of the silica powder were changed as shown in Table 2. The results are shown in Table 2. The dispersibility of the silica powder in the polyester film obtained was good, but the film obtained was inferior in transparency.

Example 14

An operation was conducted in the same manner as in Example 10 except that two kinds of silica powders different in particle diameters were used and their particle diameters and addition amounts were as shown in Table 2. The results are shown in Table 2. The dispersibility of the silica powders in the polyester film obtained was good, and the film obtained had high transparency, a low static friction coefficient and excellent handleability.

What is claimed is:

1. A thermoplastic resin composition containing inorganic particles, wherein (i) the inorganic particles have a pore volume of 0.1 to 3 ml/g and (ii) the inorganic particles are treated at the surfaces with a hydrophilic polyester of 0.05 to 10 times the weight of the inorganic particles or with a silicon-containing organic compound, wherein the inorganic particles have, in the particles size distribution, at least two peaks.

2. A thermoplastic resin composition according to claim 1, wherein the inorganic particles have an average particle diameter of 0.03 to 5 μm.

3. A thermoplastic resin composition according to claim 1, wherein the inorganic particles are contained in an amount of 0.01 to 10% by weight to the thermoplastic resin.

4. A thermoplastic resin composition according to claim 1, wherein the inorganic particles are silica particles.

5. A thermoplastic resin composition according to claim 1, wherein the thermoplastic resin is an aromatic polyester.

6. A thermoplastic resin composition containing inorganic particles, wherein (i) the inorganic particles have pore volume of 0.1 to 3 ml/g and (ii) the inorganic particles are treated at the surfaces with a hydrophilic polyester of 0.05 to 10 times the weight of the inorganic particles, wherein the inorganic particles have, in the particular size distribution, at least two peaks.

7. A thermoplastic resin composition according to claim 6, wherein the inorganic particles have an average particle diameter of 0.03 to 5 μm.

8. A thermoplastic resin composition according to claim 6, wherein the inorganic particles are contained in an amount of 0.01 to 10% by weight to the thermoplastic resin.

9. A thermoplastic resin composition according to claim 6, wherein the inorganic particles are silica particles or kaolin particles.

10. A thermoplastic resin.composition according to claim 6, wherein the thermoplastic resin is an aromatic polyester.

11. A thermoplastic resin composition according to claim 6, wherein the hydrophilic polyester is a water-soluble or water-dispersible polyester.

12. A thermoplastic resin composition containing silica particles, wherein (i) the silica particles have pore volume of

TABLE 2

| | | inorganic particles (1) | | | | inorganic particles (2) | | | | property of film | | |
| --- | --- | --- | --- | --- | --- | --- | --- | --- | --- | --- | --- | --- |
| | kind | average particle diameter (μm) | pore volume (ml/g) | treatment with silica-containing organic compound | addition amount at particles (wt %) | kind | average particle diameter (μm) | pore volume (ml/g) | treatment with silica-containing organic compound | addition amount at particles (wt %) | dispersiblity | film haze (%) | static friction coefficient |
| Ex. 10 | silica | 1.5 | 1.5 | yes | 0.06 | — | — | — | — | — | ○ | 2.7 | 0.45 |
| Ex. 11 | silica | 1.5 | 0.13 | yes | 0.06 | — | — | — | — | — | ○ | 1.8 | 0.10 |
| Ex. 12 | silica | 1.5 | 2.90 | yes | 0.06 | — | — | — | — | — | ○ | 3.1 | 0.96 |
| C. Ex. 5 | silica | 1.5 | 1.5 | no | 0.06 | — | — | — | — | — | X | 1.9 | — |
| C. Ex. 6 | silica | 1.5 | 0.08 | yes | 0.06 | — | — | — | — | — | ○ | 1.7 | 0.05 |
| C. Ex. 7 | silica | 1.5 | 3.5 | yes | 0.06 | — | — | — | — | — | ○ | 3.6 | 1.12 |
| Ex. 13 | silica | 1.5 | 1.5 | yes | 0.06 | — | — | — | — | — | ○ | 2.9 | 0.52 |
| C. Ex. 8 | silica | 0.01 | 0.2 | yes | 0.06 | — | — | — | — | — | ○ | 1.6 | — |
| C. Ex. 9 | silica | 5.5 | 1.9 | yes | 0.06 | — | — | — | — | — | ○ | 5.1 | 0.87 |
| Ex. 14 | silica | 1.5 | 1.5 | yes | 0.03 | silica | 0.05 | 0.3 | yes | 0.03 | ○ | 2.2 | 0.48 |

Ex.: Example
C. Ex.: Comparative Example 0.1 to 3 ml/g and (ii) the silica particles are treated at the surfaces with a silicon-containing organic compound, wherein the silica particles have, in the particle size distribution, at least two peaks.

13. A thermoplastic resin composition according to claim 12, wherein the silica particles have an average particle diameter of 0.03 to 5 μm.

14. A thermoplastic resin composition according to claim 12, wherein the silica particles are contained in an amount of 0.01 to 10% by weight to the thermoplastic resin.

15. A thermoplastic resin composition according to claim 12, wherein the silicon-containing organic compound is an alkylsilane compound.

16. A thermoplastic resin composition according to claim 12, wherein the thermoplastic resin is an aromatic polyester.

17. A biaxially oriented film having a static friction coefficient of 1.0 or less and a haze satisfying the following formula, which is obtained by using a thermoplastic resin composition set forth in claims 1, 6 or 12:

$$H<0.2T+1.5$$

wherein H is a film haze (%) and T is a film thickness (μm).

18. A biaxially oriented film according to claim 17, having a film thickness of 0.5 to 150 μm.

19. A biaxially oriented film according to claim 17, wherein the thermoplastic resin is an aromatic polyester.

20. A process for producing a thermoplastic resin composition by kneading a thermoplastic resin and inorganic particles using a vented double-screw kneader and extruder, in which process (i) the inorganic particles have pore volume of 0.1 to 3 ml/g, (ii) the inorganic particles are treated at the surfaces with a hydrophilic polyester of 0.05 to 10 times the weight of the inorganic particles or with a silicon-containing organic compound, and the inorganic particles are fed into the vented double-screw kneader and extruder in the form of their dispersion in water and/or an inert organic solvent, wherein the inorganic particles have, in the particles have, in the particle size distribution, at least two peaks.

21. A process for producing a thermoplastic resin composition according to claim 20, wherein the inorganic particles have an average particle diameter of 0.03 to 5 μm.

22. A process for producing a thermoplastic resin composition according to claim 20, wherein the inorganic particles are contained in an amount of 0.01 to 10% by weight to the thermoplastic resin.

23. A process for producing a thermoplastic resin composition according to claim 20, wherein the inorganic particles are silica particles or kaolin particles.

24. A process for producing a thermoplastic resin composition according to claim 20, wherein the thermoplastic resin is an aromatic polyester.

* * * * *

UNITED STATES PATENT AND TRADEMARK OFFICE
CERTIFICATE OF CORRECTION

PATENT NO. : 6,441,063 B1
DATED : August 27, 2002
INVENTOR(S) : Takafumi Kudo, Masahiko Kosuge and Akira Kameoka It is certified that error appears in the above-identified patent and that said Letters Patent is hereby corrected as shown below:

<u>Title page,</u>
Item [22], should read:

-- Item [22] PCT Filed: June 29, 1999 --

Signed and Sealed this

Twenty-first Day of January, 2003

JAMES E. ROGAN
*Director of the United States Patent and Trademark Office*